Oct. 15, 1940.  I. A. WEAVER  2,218,410
BALANCING WEIGHT FOR AUTOMOBILE WHEELS
Filed Oct. 11, 1939
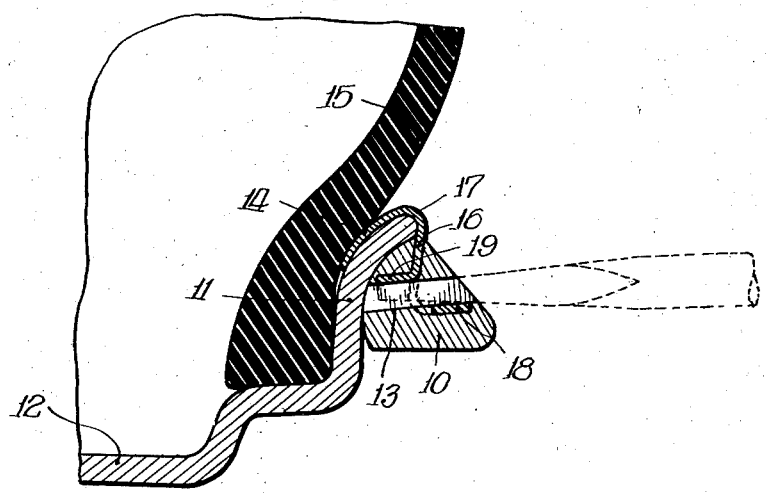
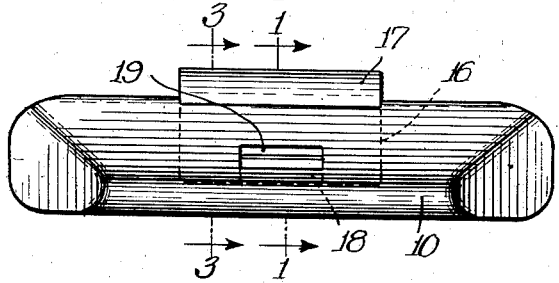
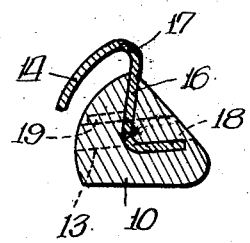
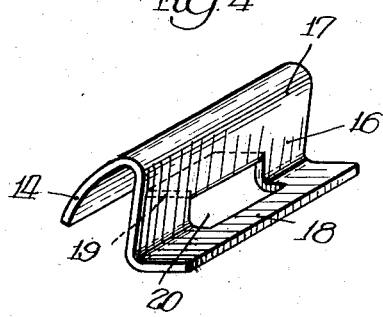
INVENTOR.
Ira A. Weaver,
BY Walter M. Fuller
ATTORNEY.

Patented Oct. 15, 1940

2,218,410

UNITED STATES PATENT OFFICE 2,218,410

BALANCING WEIGHT FOR AUTOMOBILE WHEELS

Ira A. Weaver, Springfield, Ill., assignor to Weaver Manufacturing Company, Springfield, Ill., a corporation of Illinois Application October 11, 1939, Serial No. 298,893

4 Claims. (Cl. 301—5)

My present invention relates to weights, such as are attached to the rims of automobile wheels to neutralize or counteract the unbalance of such rapidly rotating members, such unbalance, if allowed to exist, frequently resulting in unusual, undue, or irregular wearing out of the tires or sometimes producing steering difficulties.

Such weights are ordinarily made of lead, or its equivalent, and by reason of the comparative softness of such metal, the weight when pried loose from the wheel, as is occasionally necessary, is frequently injured, resulting either in its incapacity for further satisfactory use or in a non-acceptable damaged or irregular appearance.

Each of these weights usually has a supporting or sustaining clip, a part of which fits between the flange of the wheel-rim and the tire on the rim, whereby the balancing-member as a whole is securely held in its correct position on the wheel to overcome or offset the lack of balance in the latter.

My invention aims to provide a novel clip of such form and shape that, when partially embedded in the metal of the weight, it not only acts to fasten the weight to the rim in a safe and effective manner, but its association with the lead of the weight is such that the prying strain imposed on the member as a whole to force it from the rim, when occasion requires, is received by the clip rather than the lead, whereby no objectionable or substantial deformation or injury of the latter takes place.

Hence, in accordance with this invention, the lead body is supplied with a cavity and with the relatively-strong clip element about a portion of which such lead is molded, such opening in the lead weight having one or more of its walls lined by, or at least reenforced by, parts of the clip, so that when the end of a screw-driver, or other ordinarily-accessible equivalent tool, is inserted in such cavity or opening and prying pressure is applied to demount the member from the rim-flange, such removal of the member can be readily and easily accomplished without injury to the lead body, the applied force being exerted more or less directly on the securing clip to effect its release from the wheel.

In its preferred form, but not necessarily, such cavity in the lead-weight is desirably supplied as a hole extended through the lead body.

To permit those acquainted with this art to understand the current invention, both from structural and functional standpoints, a present preferred embodiment thereof has been illustrated in the accompanying drawing forming a part of this specification and to which reference should be had in connection with the following detailed description, and, for simplicity, like reference numerals have been employed in the several views of the drawing to designate the same parts.

In this drawing:

Figure 1 is a central, transverse section through the new weight-member on line 1—1 of Figure 2, showing its manner of association with the flange of the wheel-rim and with the tire, the latter two being presented fragmentarily.

Figure 2 is a side-elevation of the novel weight-member;

Figure 3 is a cross-section thereof on line 3—3 of Figure 2; and

Figure 4 is a perspective view of the attachment-clip without its companion lead-weight.

Referring to this drawing, it will be observed that the elongated lead or other equivalent weight 10 is shaped along one side to conform substantially to the contour of the outer surface of the flange 11 of the wheel-rim 12 on which it is designed to be mounted for wheel-balancing purposes.

As is clearly shown, the central part of such weight has a transverse cavity therein, in the present instance, in the form of a hole or aperture 13 extended laterally through the weight and desirably of substantially rectangular shape in cross-section.

The relatively-stiff clip for securing the weight to the wheel-rim includes a suitably-curved, external part 14 spaced from the weight 10 and adapted to be accommodated between the inner face of the rim-flange 11 and the outer surface of the pneumatic-tire 15, such part 14, in the present case, being the full length of the clip.

Such clip includes an intermediate main wall 16 embedded in the lead-weight 10 and projecting outwardly from such weight at 17, the part 14 constituting a bent continuation of the sections 16 and 17.

As is fully shown, a flange 18 extends outwardly from and desirably the full length of the main body 16 of the clip or weight-supporting member.

By shearing or cutting the flat blank from which the clip is formed along three lines and bending the portion thereof defined by such cuts, there is provided a shorter intermediate flange 19 and an aperture 20 through the clip of the same size as, and in register with, the hole 13 through the weight 10.

A clip of this form and style having been provided from a suitable flat metal blank (not shown) and by appropriate bending operations, readily understood, the metal-weight 10 is cast around a portion of the clip, thus, as shown, embedding a part of the clip in the lead constituting the weight.

In this casting of the lead around the clip, the two apertures 13 and 20 are in register, the upper or outer wall of the hole 13 is reinforced and strengthened by lining the inner portion thereof by the clip flange 19 and the lower or inner wall of the same aperture is given additional support and rigidity by lining the outer part thereof by the middle bridge portion of the clip-flange 18, the ends of which are securely anchored, by being embedded, in the corresponding parts of the lead-member.

Thus the lead-weight is firmly secured to the clip and is adapted to be supported thereby in service as shown in Figure 1.

If it becomes necessary or desirable to demount such balancing-member from the wheel-rim, the end of a screw-driver or similar, ordinarily easily-accessible tool, is inserted in the registered apertures 13, 20, and, by means of such tool, the member may be comparatively easily and quickly pried loose from the rim, and, during such removal operation, one part of the blade of the screwdriver engages the lip or flange 19 and another part of the blade bears on the bridge-portion of the flange 18, whereby the applied pressure or force is exerted more or less directly on the relatively-strong and comparatively non-ductile clip-member.

By reason of the construction of the device, its demounting or removal from the rim can be brought about without mutilation of the relatively-ductile lead-weight, so that the device can be used over and over with facility.

It is not essential that the lips or flanges of the clip actually line the surfaces of the hole through the lead-member, it being sufficient that those parts of the latter on which the screwdriver or other tool bears be adequately reinforced or stiffened by portions of the comparatively firm clip, and, in fact, in some cases, such clip lips or flanges may be embedded in the lead itself.

In Figure 1 of the drawing, the specified screwdriver or comparable instrument has been shown in operative position in dotted lines, but such tool while used with the new weight-member constitutes no part of the present invention.

This invention as defined and measured by the appended claims is not limited and restricted to the precise and exact details of structure shown and described because modifications or changes may be resorted to without departure from the heart and essence of the invention and without the sacrifice of any of its material benefits and advantages.

I claim:

1. A balancing-member designed for attachment to the rim of an automobile wheel with a clip of said member between a flange of said rim and the tire mounted on said rim, said balancing-member including, in combination, a weight with a cavity extending inwardly from the outer surface of said weight and an attachment-clip having a part spaced from said weight adapted to be accommodated between said flange and tire and an apertured part embedded in said weight with said aperture and cavity in register with and in communication with one another, said embedded part of said clip having a projecting flange at one margin of said aperture lining a portion of the corresponding wall of said cavity, said clip having a second oppositely-projecting flange at the opposite margin of said aperture lining a portion of the corresponding opposite wall of said cavity, whereby an implement introduced into said cavity and aperture will engage said flanges during prying pressure applied to said implement to remove the balancing-member from the wheel thereby protecting the material of the weight from injury during such operation.

2. The balancing-member set forth in claim 1 in which said cavity is a hole extended through said weight.

3. The balancing-member set forth in claim 1 in which said aperture is substantially rectangular in shape.

4. The balancing-member set forth in claim 1 in which said cavity is a hole extended through said weight and in which said aperture is substantially rectangular in shape.

IRA A. WEAVER.